(12) United States Patent
Yun et al.

(10) Patent No.: US 12,476,298 B2
(45) Date of Patent: Nov. 18, 2025

(54) POUCH TYPE BATTERY CASE AND POUCH TYPE SECONDARY BATTERY

(71) Applicant: LG Energy Solution, Ltd., Seoul (KR)

(72) Inventors: Nan Ji Yun, Daejeon (KR); Hyun Jung Na, Daejeon (KR); Seung Hee Yang, Daejeon (KR); Jin Seo Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 793 days.

(21) Appl. No.: 17/635,551

(22) PCT Filed: Oct. 23, 2020

(86) PCT No.: PCT/IB2020/059961
§ 371 (c)(1),
(2) Date: Jun. 21, 2022

(87) PCT Pub. No.: WO2021/038545
PCT Pub. Date: Mar. 4, 2021

(65) Prior Publication Data
US 2023/0071692 A1   Mar. 9, 2023

(30) Foreign Application Priority Data

Aug. 28, 2019   (KR) .................. 10-2019-0106157

(51) Int. Cl.
*H01M 10/647* (2014.01)
*H01M 10/04* (2006.01)
(Continued)

(52) U.S. Cl.
CPC ..... *H01M 10/647* (2015.04); *H01M 10/0463* (2013.01); *H01M 50/105* (2021.01); *H01M 50/186* (2021.01)

(58) Field of Classification Search
CPC ........... H01M 10/647; H01M 10/0463; H01M 10/0436; H01M 50/186; H01M 50/105;
(Continued)

(56) References Cited

U.S. PATENT DOCUMENTS

| 10,454,130 | B2 * | 10/2019 | Choi ................. H01M 50/136 |
| 11,673,311 | B2 * | 6/2023 | Suh ....................... B29C 51/30 |
| | | | 29/623.2 |
| 2006/0269840 | A1 | 11/2006 | Oogami et al. |

(Continued)

FOREIGN PATENT DOCUMENTS

| KR | 20120051424 A | 5/2012 |
| KR | 20130133585 A | 12/2013 |

(Continued)

OTHER PUBLICATIONS

ESPACENET translation of KR20170022156A (Year: 2017).*
(Continued)

*Primary Examiner* — Haroon S. Sheikh
(74) *Attorney, Agent, or Firm* — Lerner David LLP

(57) ABSTRACT

A pouch type battery case includes: a first cup part and a second cup part, which are recessed with respect to a sealing part; and a bridge formed between the first cup part and the second cup part and having a constant width and height, wherein the first cup part includes: a first outer wall formed opposite the bridge; a second outer wall formed adjacent the bridge; and a first bottom portion connecting the first outer wall to the second outer wall, and the second cup part includes: a third outer wall formed adjacent the bridge; a fourth outer wall formed opposite the bridge; and a second bottom portion connecting the third outer wall to the fourth outer wall, wherein the fourth outer wall has a height greater than that of the first outer wall.

11 Claims, 5 Drawing Sheets

(51) Int. Cl.
H01M 50/105 (2021.01)
H01M 50/186 (2021.01)

(58) Field of Classification Search
CPC ............. H01M 50/124; H01M 50/131; H01M 10/058; H01M 10/38; H01M 10/04; H01M 10/64
See application file for complete search history.

(56) References Cited

U.S. PATENT DOCUMENTS

| | | | |
|---|---|---|---|
| 2013/0101894 A1* | 4/2013 | Baba | H01M 50/105 493/162 |
| 2013/0323563 A1 | 12/2013 | Eo | |
| 2015/0303414 A1 | 10/2015 | Park et al. | |
| 2018/0138470 A1 | 5/2018 | Park et al. | |
| 2018/0219245 A1 | 8/2018 | Choi et al. | |
| 2018/0366690 A1* | 12/2018 | Levin | H01M 50/119 |
| 2019/0027714 A1 | 1/2019 | Jung et al. | |
| 2019/0229301 A1 | 7/2019 | Li et al. | |
| 2020/0168852 A1 | 5/2020 | Oh et al. | |

FOREIGN PATENT DOCUMENTS

| | | |
|---|---|---|
| KR | 101403692 B1 | 6/2014 |
| KR | 101446150 B1 | 10/2014 |
| KR | 20140115846 A | 10/2014 |
| KR | 20170022156 A | 3/2017 |
| KR | 20170052061 A | 5/2017 |
| KR | 20170088024 A | 8/2017 |
| KR | 20180055427 A | 5/2018 |
| KR | 20190090153 A | 8/2019 |
| KR | 20190093045 A | 8/2019 |

OTHER PUBLICATIONS

ESPACENET of KR101446150B1 (Year: 2014).*
KR20120051424A reference ESPACENET translation (Year: 2012).*
Extended European Search Report for Application No. 20859168.5 dated Oct. 10, 2022. 8 pgs.
International Search Report for Application No. PCT/IB2020/059961 mailed Feb. 3, 2021, 2 pages.

* cited by examiner

# POUCH TYPE BATTERY CASE AND POUCH TYPE SECONDARY BATTERY

CROSS-REFERENCE TO RELATED APPLICATION

The present application is a national stage entry under 35 U.S.C. § 371 of PCT/IB2020/059961 filed on Oct. 23, 2020 and claims the benefit of the priority of Korean Patent Application No. 10-2019-0106157, filed on Aug. 28, 2019, which is hereby incorporated by reference in its entirety.

TECHNICAL FIELD

The present invention relates to a pouch type battery case and a pouch type secondary battery, and more particularly, to a pouch type battery case capable of increasing in capacity of a secondary battery while preventing a sealing part from further protruding from a bottom portion of the cup part, and a pouch type secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode, a separator, and an anode are manufactured and stacked. Specifically, cathode active material slurry is applied to a cathode collector, and anode active material slurry is applied to an anode collector to manufacture a cathode and an anode. Also, when the separator is interposed and stacked between the manufactured cathode and anode, unit cells are formed. The unit cells are stacked on each other to form an electrode assembly. Also, when the electrode assembly is accommodated in a specific case, and an electrolyte is injected, the secondary battery is manufactured.

Such a secondary battery is classified into a pouch type secondary battery and a can type secondary battery according to a material of a battery case accommodating an electrode assembly. In the pouch type secondary battery, the electrode assembly is accommodated in a pouch made of a flexible polymer material having a variable shape. Also, in the can type secondary battery, an electrode assembly is accommodated in a case made of a metal or plastic material having a predetermined shape.

The pouch type battery case is manufactured by performing drawing molding on a pouch film having flexibility to form a cup part. The drawing molding is performed by inserting a pouch film into a press and applying a pressure to the pouch film through a punch to stretch the pouch film. In addition, when the cup part is formed, an electrode assembly is accommodated in an accommodation space of the cup part, and then, the battery case is folded to seal a sealing part, thereby manufacturing a secondary battery.

When the cup part is molded in the pouch film, two cup parts that are symmetrical to each other may be drawn and molded to be adjacent to each other in one pouch film. Also, the electrode assembly may be accommodated in the accommodation space of the one cup part, and then, the battery case may be folded so that the two cup parts face each other. As a result, since the two cup parts accommodate the one electrode assembly, the electrode assembly having a thickness thicker than of an electrode assembly accommodated in one cup part. Also, since the battery case is folded to form one edge of the secondary battery, only three edges except for the one edge may be sealed when a sealing process is performed later. Thus, the number of edges to be sealed may be reduced to improve a process rate and reduce the number of trimming processes.

Recently, as the secondary battery increases in energy capacity, the electrode assembly is thicker. Accordingly, two cup parts are formed to accommodate the electrode assembly from above and below. However, if the two cup parts have the same thickness, when the sealing part is folded, the length of the sealing part may be long to cause a problem in which the sealing part further protrudes from each of the bottom portions of the cup parts.

In addition, when the two cup parts are formed side by side on a pouch film, a bridge is formed between the two cup parts. However, if the bridge has a narrow width, an outer wall formed toward the bridge on the entire outer wall of the cup part has a relatively short stretchable length compared to the outer wall formed toward an opposite side of the bridge. Therefore, there is a problem in that the outer wall having a relatively long stretchable length is not more stretched, and thus capacity of the secondary battery does not more increase.

In addition, in the related art, when the battery case is folded and sealed by applying heat and a pressure, a portion of one folded edge of the secondary battery protrudes outward. This is called a bat ear. When the bat ear is formed to protrude, an unnecessary volume more increases, and thus an error occurs in a designed size of the secondary battery. Thus, when assembling secondary batteries to manufacture a battery module or the like, there is a problem in that it is not easy to assembly the secondary batteries, and each of the secondary batteries has to be designed with a small size from the beginning. Also, since the secondary battery increases in volume as a whole, there is also a problem in that energy density to the volume decreases.

(Patent Document 1) Korea Patent Publication No. 2017-0088024

DISCLOSURE OF THE INVENTION

Technical Problem

An object of the present invention for solving the above problem is to provide a pouch type battery case capable of increasing in capacity of a secondary battery while preventing a sealing part from further protruding from a bottom portion of the cup part, and a pouch type secondary battery.

The objects of the present invention are not limited to the aforementioned object, but other objects not described herein will be clearly understood by those skilled in the art from descriptions below.

Technical Solution

A pouch type battery case configured to accommodate an electrode assembly, in which electrodes and separators are stacked, according to an embodiment of the present invention for achieving the above object includes: a first cup part and a second cup part, which are recessed with respect to a sealing part; and a bridge formed between the first cup part and the second cup part and having a constant width and height, wherein the first cup part includes: a first outer wall formed opposite the bridge; a second outer wall formed adjacent the bridge; and a first bottom portion connecting the first outer wall to the second outer wall, and the second cup part includes: a third outer wall formed adjacent the bridge; a fourth outer wall formed opposite the bridge; and a second bottom portion connecting the third outer wall to the fourth outer wall, wherein the fourth outer wall has a height greater than that of the first outer wall.

Also, at least one of the first bottom portion or the second bottom portion may be inclined toward the bridge.

Also, a ratio of a sum of the height of the first outer wall and the height of the fourth outer wall to a sum of a height of the second outer wall, the width of the bridge, and a height of the third outer wall may be between about 0.95 and about 1.05.

Also, the ratio may be 0.99 to 1.01.

Also, the third outer wall may have a height greater than that of the second outer wall.

Also, the first outer wall may have a height greater than that of the second outer wall, and the fourth outer wall may have a height greater than that of the third outer wall.

Also, the bridge may have a width of between about 0.2 cm and about 6 cm.

A pouch type secondary battery according to an embodiment of the present invention for achieving the above object includes: an electrode assembly in which electrodes and separators are stacked; a battery case which includes: a first cup part and a second cup part, which when folded to face each other accommodate the electrode assembly therein; a bridge integrally connecting the first cup part to the second cup part; and sealing parts extending outward from peripheries of the first cup part and the second cup part to face each other and to be sealed to each other, wherein the first cup part includes: a first outer wall formed opposite the bridge; a second outer wall extending from the bridge; and a first bottom portion connecting the first outer wall to the second outer wall, and wherein the second cup part includes: a third outer wall extending from the bridge; a fourth outer wall formed opposite the bridge; and a second bottom portion connecting the third outer wall to the fourth outer wall, wherein the fourth outer wall has a height greater than that of the first outer wall.

Also, at least one of the first bottom portion or the second bottom portion may be inclined toward the bridge.

Also, the sealing parts may extend outward from the first cup part and the second cup part, respectively, and when the first cup part is folded to face the second cup part, the sealing part may be sealed to each other and folded toward the second cup part.

Also, the sealed sealing part may be folded two or more times in succession.

Also, the sealed sealing part may have a folded length less than a height of the fourth outer wall.

Also, when the first cup part is folded to face the second cup part, the first bottom portion and the second bottom portion may be formed parallel to each other.

Particularities of other embodiments are included in the detailed description and drawings.

Advantageous Effects

According to the embodiments of the present invention, there are at least the following effects.

Since the two cup parts have different depths, and the sealing part is folded toward the deeper cup part, even if the length of the sealing part is long, it may prevent the sealing part from more protruding outward from the bottom portion of the cup part.

In addition, since the bottom portions of the cup parts are inclined toward the bridge, the outer wall formed at the opposite side of the bridge is formed to be higher so that the secondary battery increases in capacity.

In addition, since the sealing part is double-folded, it may not be necessary to excessively stretch the outer wall of the cup part formed toward the opposite side of the bridge.

In addition, when the secondary battery is completely manufactured, the bottom portions of the two cup parts may be formed parallel to each other.

In addition, the bat ear may be reduced in size to reduce the error occurring in the designed size of the secondary battery, and the secondary batteries may be easily assembled to manufacture the battery module.

The effects of the prevent invention are not limited by the aforementioned description, and thus, more varied effects are involved in this specification.

MODE FOR CARRYING OUT THE INVENTION

Figure 1:
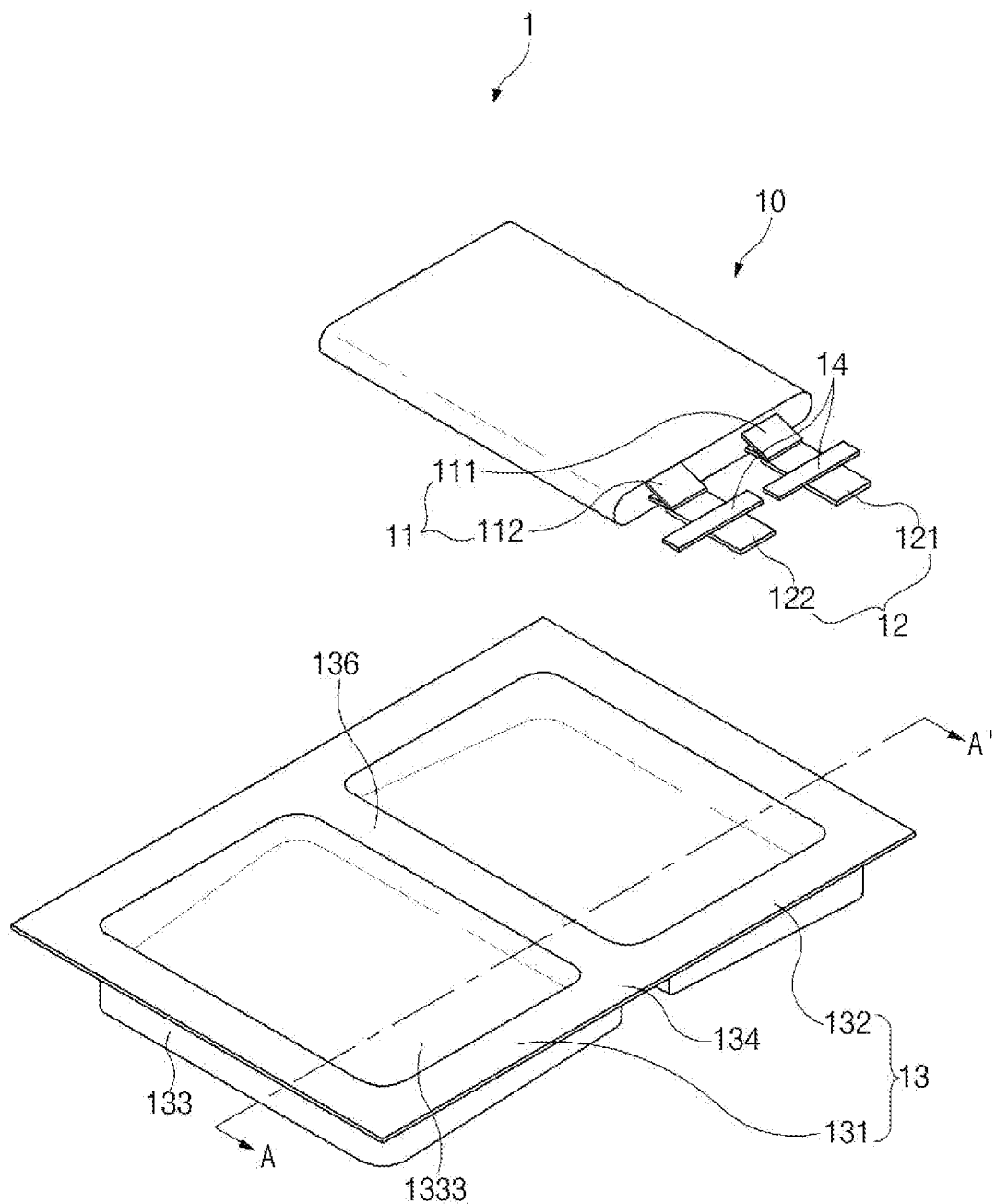
FIG. 1 is an assembled view of a pouch type secondary battery according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is an assembled view of a pouch type secondary battery 1 according to an embodiment of the present invention.

As illustrated in FIG. 1, the pouch type secondary battery 1 according to an embodiment of the present invention includes an electrode assembly 10, in which electrodes such as a positive electrode and a negative electrode and separators are stacked, and a pouch type battery case 13 accommodating the electrode assembly 10 therein.

To manufacture the pouch type secondary battery 1, first, slurry in which an electrode active material, a binder, and a plasticizer are mixed with each other is applied to a positive electrode collector and a negative electrode collector to manufacture electrodes such as a positive electrode and a negative electrode. The electrodes are stacked on both sides of the separator to manufacture the electrode assembly 10 having a predetermined shape. Then, the battery case 13 is sealed after the electrode assembly 10 is inserted into the battery case 13, and an electrolyte is injected into the battery case 13.

Particularly, the electrode assembly 10 may be a stacked structure including two types of electrodes such as a positive electrode and a negative electrode and a separator disposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two types of electrodes, i.e., the positive electrode and the negative electrode has a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part 134, on which a first case 131 and a second case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 includes a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the cathode lead 121 may be made of the same material as the cathode collector, i.e., an aluminum (Al) material, and the anode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Hereinafter, the case in which the battery case 13 is the pouch will be described. When a pouch film having flexibility is drawn by using a punch or the like, a portion of the pouch film is stretched to form a cup part 133 including a pocket-shaped accommodation space 1333, thereby manufacturing the battery case 13. The battery case 13 accommodates the electrode assembly 10 so that a portion of the electrode lead 12, i.e., the terminal part is exposed and then is sealed. As illustrated in FIG. 1, the battery case 13 includes a first case 131 and a second case 132. The accommodation space 1333 formed in each of the cup parts 133 to accommodate the electrode assembly 10 may be provided in the first case 131 and the second case 132. When the electrode assembly 10 is accommodated in the accommodation space 1333, the battery case 13 is folded so that the first case 131 and the second case 132 face each other. Also, the sealing part 134 is sealed so that the electrode assembly 10 is not separated to the outside of the battery case 13, thereby sealing the accommodation space 1333.

A bridge 136 is a portion that is not molded between the two cup parts 133 when drawing and molding the two cup parts 133 so as to be adjacent to each other in the pouch film. Thus, the bridge 136 is formed between the two cup parts 133 and has a constant width w (see FIG. 2) and a constant height. In addition, when the battery case 13 is folded to manufacture the secondary battery 1, the outer walls bent from both ends of the bridge 136 are unfolded. Detailed description of the bridge 136 will be described later.

When the electrode lead 12 is connected to the electrode tab 11 of the electrode assembly 10, and the insulation part 14 is formed in a portion of the electrode lead 12, the electrode assembly 10 is accommodated in the accommodation space 1333 provided in one cup part 133 of the first case 131 and the second case 132, and the remaining case of the first case 131 and the second case 132 covers the accommodation space 1333. Also, the electrolyte is injected into the accommodation space, and the sealing part 134 formed on edges of the first case 131 and the second case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. The pouch type secondary battery 1 may be manufactured through the above-described method.

Figure 2:
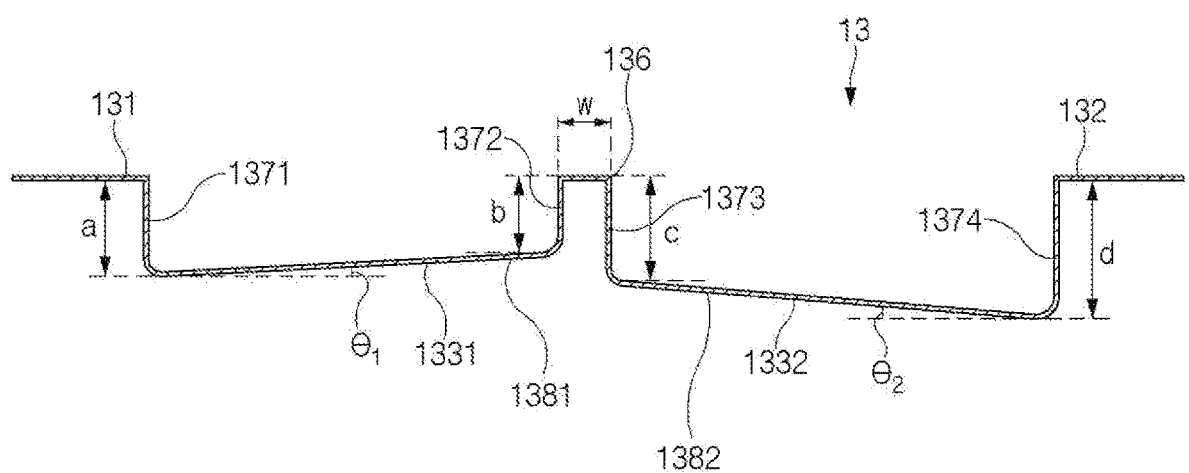
FIG. 2 is a cross-sectional view of a battery case, taken along line A-A' according to an embodiment of the present invention.

FIG. 2 is a cross-sectional view of the battery case 13, taken along line A-A' according to an embodiment of the present invention.

According to an embodiment of the present invention, since the two cup parts 133 are different depths, and the sealing part 134 is folded toward the cup part 133 having the deeper depth, even if a length of the sealing part 134 is long, it may prevent the cup parts 133 from more protruding outward from a bottom portion. Also, since the bottom portions of the cup parts 133 are inclined toward the bridge 136, the outer wall formed at an opposite side of the bridge 136 may be formed to be higher so that the secondary battery 1 increases in capacity. Also, since the sealing part 134 is double-folded, it is unnecessary to excessively stretch the outer wall of the cup part 133 formed toward the opposite side of the bridge 136. Also, when the secondary battery 1 is completely manufactured, the bottom portions of the two cup parts 133 may be formed parallel to each other. In addition, a bat ear may be reduced in size to reduce the error occurring in the designed size of the secondary battery, and the secondary batteries may be easily assembled to manufacture the battery module.

For this, the pouch type battery case 13 configured to accommodate the electrode assembly 10, in which the electrodes and the separators are stacked, according to an embodiment of the present invention includes: a first cup part 1331 and a second cup part 1332, which are arranged parallel to a pouch film and formed to be recessed; and a bridge 136 formed between the first cup part 1331 and the second cup part 1332 and having a constant width w and height. The first cup part 1331 includes: a first outer wall 1371 formed toward an opposite to the bridge 136; a second outer wall 1372 formed toward the bridge 136; and a first bottom portion 1381 configured to connect the first outer wall 1371 to the second outer wall 1372, and the second cup part 1332 includes: a third outer wall 1373 formed toward the bridge 136; a fourth outer wall 1374 formed toward the opposite to the bridge 136; and a second bottom portion 1382 configured to connect the third outer wall 1373 to the fourth outer wall 1374. At least one of the first bottom portion 1381 or the second bottom portion 1382 is inclined toward the bridge 136, and the fourth outer wall 1374 has a height greater than that of the first outer wall 1371.

Recently, as the secondary battery 1 increases in energy capacity, the electrode 10 is thicker. However, in the related art, only one cup part 133 is formed, and thus a depth of the cup part 133 needs to further increase. However, when drawing-molding is performed on the pouch film, if it is formed too deeply, cracks occur at the edges, and whitening occurs around the cracks. As a result, there is a limit to the depth of the cup part 133.

Therefore, as described above, according to an embodiment of the present invention, as illustrated in FIG. 2, the drawing-molding is performed on the pouch film to manufacture the battery case 13 including two cup parts 133 such as the first and second cup parts 1331 and 1332. That is, the first cup part 1331 is formed in the first case 131, and the second cup part 1332 is formed in the second case 132. Also, as illustrated in FIG. 2, the first cup part 1331 includes the first outer wall 1371 formed toward the opposite side of the bridge 136, the second outer wall 1372 formed toward the bridge 136, and the first bottom portion 1381 connecting the first outer wall 1371 to the second outer wall 1372. In addition, the second cup part 1332 includes the third outer wall 1373 formed toward the bridge 136, the fourth outer wall 1374 formed toward the opposite side of the bridge 136, and the second bottom portion 1382 connecting the third outer wall 1373 to the fourth outer wall 1374.

As described above, the first cup part 1331 and the second cup part 1332 are molded side by side on the pouch film to manufacture the battery case 13, and then a portion between the first cup part 1331 and the second cup part 1332 is folded. Accordingly, the first cup part 1331 and the second cup part 1332 may accommodate the electrode assembly 10 from above and below.

However, if the first cup part 1331 and the second cup part 1332 have the same depth, when the folding is performed after sealing the sealing part 134, the sealing part 134 may protrude from the bottom portion even if folded in any one direction of the first cup part 1331 and the second cup part 1332 because the sealing part 134 has a long length. Thus, according to an embodiment of the present invention, the first cup part 1331 and the second cup part 1332 have different depths as a whole. Here, the second cup part 1332 has a length greater than that the first cup part 1331 as a whole.

Particularly, in the first outer wall 1371 and the fourth outer wall 1374, which are formed toward the opposite side of the bridge 136, a height d of the fourth outer wall 1374 is greater than a height a of the first outer wall 1371. Also, in the second outer wall 1372 and the third outer wall 1373, which are formed toward the bridge 136, a height c of the third outer wall 1373 is greater than a height b of the second outer wall 1372. Also, the sealing part 134 is folded toward the second cup part 1332 having the deeper depth, in particular, the fourth outer wall 1374.

When the first cup part 1331 and the second cup part 1332 are molded side by side on the pouch film, the bridge 136 having a constant width w and height is formed between the first cup part 1331 and the second cup part 1332. It is preferable that the width w of the bridge 136 is 0.2 cm to 6 cm. In general, in the case of the small secondary battery 1, the width w of the bridge 136 may be 0.2 cm to 0.7 cm, and in the case of the medium and large secondary battery 1, the width w of the bridge 136 may be 1 cm to 6 cm. If the width w of the bridge 136 is less than 0.2 cm, there is a problem that cracks occur in the bridge 136 when the two cup parts 133 are molded. In addition, if the width w of the bridge 136 is greater than 6 cm, when the battery case 13 is folded to manufacture the secondary battery 1, a large unnecessary space is occupied to deteriorate energy efficiency to volume.

However, when the width w of the bridge 136 is narrow, the second outer wall 1372 of the first cup part 1331 and the third outer wall 1373 of the second cup part 1332 are disposed at a very close distance with the bridge 136 therebetween. Thus, each of the second outer wall 1372 and the third outer wall 1373 has a relatively short stretchable length when compared to the first outer wall 1371 and the fourth outer wall 1374.

According to an embodiment of the present invention, as illustrated in FIG. 2, each of a first bottom portion 1381 and a second bottom portion 1382 have an inclination toward the bridge 136. Particularly, in the first cup part 1331, the height a of the first outer wall 1371 is greater than the height b of the second outer wall 1372, and in the second cup part 1332, the height d of the fourth outer wall 1374 is greater than the height c of the third outer wall 1373. That is, it is preferable that each of the outer walls formed toward the opposite side of the bridge 136 has a height greater than that of each of the outer walls formed toward the bridge 136. Accordingly, the heights a and d of the first outer wall 1371 and the fourth outer wall 1374 having relatively long stretchable lengths may increase, and thus the accommodation space 1333 may increase in volume, and secondary battery 1 may increase in capacity. However, the present invention is not limited thereto, and only one of the first bottom portion 1381 and the second bottom portion 1382 may have the inclination.

Also, as the heights b and c of the second outer wall 1372 and the third outer wall 1373 increase, an amount of stretchiness may increase with respect to the bridge 136. Therefore, when the secondary battery 1 is manufactured, a portion of the folded edge may protrude to form a bat ear. However, according to an embodiment of the present invention, when compared to the first outer wall 1371 and the fourth outer wall 1374, the heights b and c of the second outer wall 1372 and the third outer wall 1373 are relatively less stretchable. Thus, since the stretched amount is not large with respect to the width w of the bridge 136, a size of the bat ear may be reduced to reduce an error occurring in the designed size of the secondary battery 1, and the secondary batteries 1 may be easily assembled to form the battery module or the like.

Figure 3:
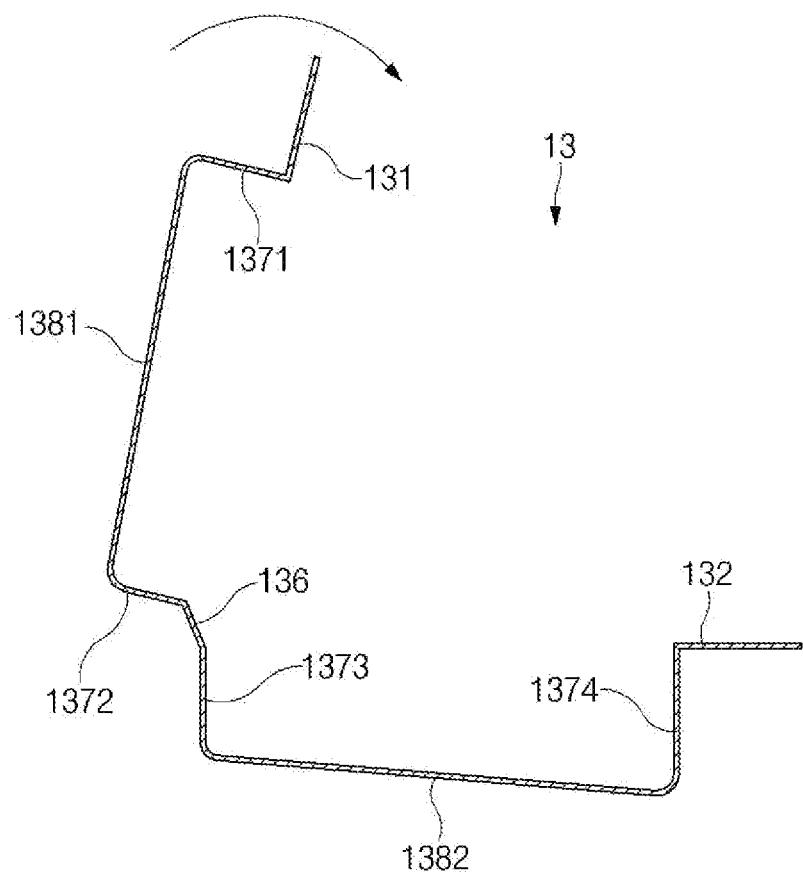
FIG. 3 is a cross-sectional view illustrating a configuration in which the battery case of FIG. 2 is being folded.
Figure 4:
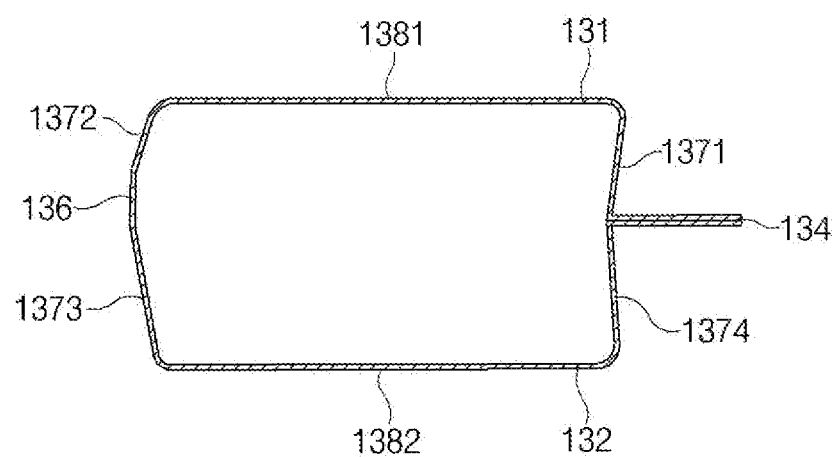
FIG. 4 is a cross-sectional view illustrating a configuration in which the folding of the battery case of FIG. 2 is completed.

FIG. 3 is a cross-sectional view illustrating a configuration in which the battery case of FIG. 2 is being folded, and FIG. 4 is a cross-sectional view illustrating a configuration in which the folding of the battery case of FIG. 2 is completed.

In the battery case 13, the second outer wall 1372 and the third outer wall 1373 are bent from both ends of the bridge 136, respectively. Then, the electrode assembly 10 is accommodated in the accommodation space 1333 of the cup part 133 formed in the battery case 13, and the battery case 13 is folded. Then, as illustrated in FIG. 3, a portion between the second outer wall 1372 and the bridge 136 and a portion between the third outer wall 1373 and the bridge 136 are unfolded.

When the battery case 13 is completely folded, as illustrated in FIG. 4, the first cup part 1331 and the second cup part 1332 completely surround and accommodate the electrode assembly 10. Also, the sealing part 134 extending outward from a periphery of the first cup part 1331 and the sealing part 134 extending outward from a periphery of the second cup part 1332 face each other to contact each other.

Here, an inclination formed by the first bottom portion 1381 toward the bridge 136 and an inclination formed by the second bottom portion 1382 toward the bridge 136 may be different from each other. However, when the battery case 13 is completely folded, it is preferable that the first bottom portion 1381 and the second bottom portion 1382 are substantially parallel to each other. As a result, the secondary battery 1 may have a stable shape to stably accommodate the electrode assembly 10. Here, the term 'substantially parallel to each other' means not only a case of being completely parallel to each other but also a case of being close to being parallel so as to enough to stably accommodate the electrode assembly 10.

For this, an inclination angle θ1 of the inclination formed by the first bottom portion 1381 (see FIG. 2) and an inclination angle θ2 formed by the second bottom portion 1382 (see FIG. 2) have to be equal or similar to each other. For this, a ratio of the sum of the height a of the first outer wall 1371 and the height d of the fourth outer wall 1374 to the sum of the height b of the second outer wall 1372, the width w of the bridge 136, and the height c of the third outer wall 1373 may be preferably 0.95 to 1.05, and in particularly, the ratio may be 0.99 to 1.01. If the ratio is less than 0.95 or greater than 1.05, since the first bottom portion 1381 and the second bottom portion 1382 are not parallel to each other, the secondary battery 1 may have an unstable shape.

According to an embodiment of the present invention, as illustrated in FIG. 4, the portion between the second outer wall 1372 and the bridge 136 and the portion between the third outer wall 1373 and the bridge 136 may not be completely unfolded, and thus the bent shape may remain to some extent.

However, according to another embodiment of the present invention, the portion between the second outer wall 1372 and the bridge 136 and the portion between the third outer wall 1373 and the bridge 136 may be unfolded to be completely flat. In this case, the second outer wall 1372, the bridge 136, and the third outer wall 1373 may exist on one plane.

However, even in this case, the bent and then unfolded trace may remain the boundaries between the second outer wall 1372 and the bridge 136 and between the third outer wall 1373 and the bridge 136. For example, a swell may be finely formed on the surface of the battery case, or wrinkles may be formed, and thus, the trace may remain on the boundaries. Even after the secondary battery 1 is manufactured, the second outer wall 1372, the bridge 136, and the third outer wall 1373 may be specified based on the trace.

Figure 5:
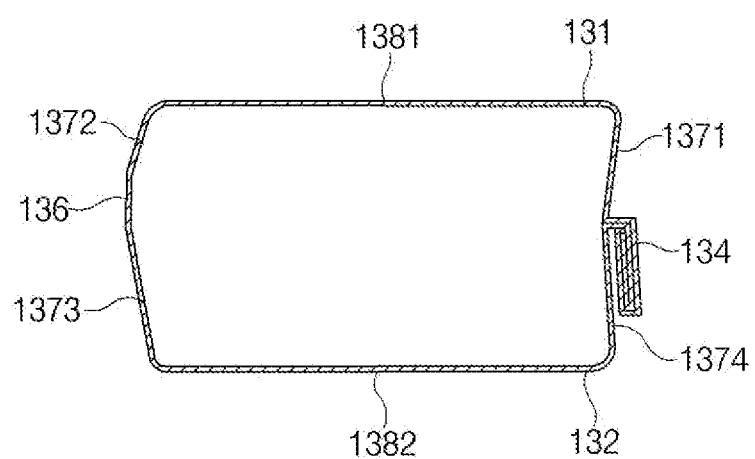
FIG. 5 is a cross-sectional view illustrating a configuration in which folding of a sealing part of the battery case of FIG. 2 is completed.

FIG. 5 is a cross-sectional view illustrating a configuration in which the folding of the sealing part 134 of the battery case 13 of FIG. 2 is completed.

When the battery case 13 is completely folded, the sealing part 134 of the first cup part 1331 and the sealing part 134 of the second cup part 1332 face each other to contact each other. Also, heat and a pressure may be applied to the sealing part 134 to seal the sealing part, thereby sealing the inside of the secondary battery 1.

Here, in order to easily seal the sealing part 134, it is preferable that the sealing part 134 is long to some extent. However, if the sealing part 134 is left as it is, it is preferable to fold the sealing part 134 because an unnecessary space is occupied when the secondary battery 1 is manufactured.

Here, according to an embodiment of the present invention, when the sealing part 134 is folded, the sealing part 134 may be folded toward the second cup part 1332 having the deeper depth, particularly, the fourth outer wall 1374. In addition, it is preferable that a length of the folded sealing part 134 is less than the height of the fourth outer wall 1374 of the second cup part 1332. As a result, it is possible to prevent the sealing part 134 from more protruding outside from the bottom portion after being folded.

Furthermore, according to an embodiment of the present invention, it is preferable that the sealing unit 134 is double-folded, that is, folded two or more times in succession, as illustrated in FIG. 5. Therefore, even if the length of the sealing part 134 is significantly long, it is not necessary to excessively stretch the outer wall of the cup part 133 formed toward the opposite side of the bridge 136, particularly, the fourth outer wall 1374.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

1: Secondary battery 10: Electrode assembly
12: Electrode lead 11: Electrode tab
13: Battery case 14: Insulating part
111: Positive electrode tab 112: Negative electrode tab
121: Positive electrode lead 122: Negative electrode lead
131: First case 132: Second case
133: Cup part 134: Sealing part
136: Bridge 1331: first cup part
1332; Second cup part 1333: Accommodation space
1371: First outer wall 1372: Second outer wall
1373: Third outer wall 1374: Fourth outer wall

The invention claimed is:

1. A pouch type battery case configured to accommodate an electrode assembly, in which electrodes and separators are stacked, the pouch type battery case comprises:
a first cup part and a second cup part, which are recessed with respect to a sealing part that includes a first sealing part and a second sealing part; and
a bridge formed between the first cup part and the second cup part, the bridge having a constant width and height,
wherein the first cup part comprises:
a first outer wall formed opposite the bridge and adjacent the first sealing part;
a second outer wall formed adjacent the bridge; and
a first bottom portion connecting the first outer wall to the second outer wall,
the second cup part comprises:
a third outer wall formed adjacent the bridge;
a fourth outer wall formed opposite the bridge and adjacent the second sealing part; and
a second bottom portion connecting the third outer wall to the fourth outer wall,
wherein the fourth outer wall has a height greater than that of the first outer wall,
wherein the first bottom portion and the second bottom portion are inclined toward the bridge at equal inclination angles relative to the bridge, and
wherein, prior to folding the first cup part and the second cup part, the first sealing part and the first outer wall form a right angle therebetween, and the second sealing part and the fourth outer wall form a right angle therebetween.

2. The pouch type battery case of claim 1, wherein a ratio of a sum of the height of the first outer wall and the height of the fourth outer wall to a sum of a height of the second outer wall, the width of the bridge, and a height of the third outer wall is between 0.95 and 1.05.

3. The pouch type battery case of claim 2, wherein the ratio is between 0.99 and 1.01.

4. The pouch type battery case of claim 1, wherein the third outer wall has a height greater than that of the second outer wall.

5. The pouch type battery case of claim 1, wherein the first outer wall has a height greater than that of the second outer wall, and
the fourth outer wall has a height greater than that of the third outer wall.

6. The pouch type battery case of claim 1, wherein the bridge has a width of between 0.2 cm and 6 cm.

7. A pouch type secondary battery comprising:
an electrode assembly in which electrodes and separators are stacked;
a battery case comprising:
a first cup part and a second cup part, which when folded to face each other accommodate the electrode assembly therein;
a bridge integrally connecting the first cup part to the second cup part; and
sealing parts extending outward from peripheries of the first cup part and the second cup part to face each other and to be sealed to each other, the sealing parts including a first sealing part and a second sealing part,
wherein the first cup part comprises:
a first outer wall formed opposite the bridge and adjacent the first sealing part;
a second outer wall extending from the bridge; and
a first bottom portion connecting the first outer wall to the second outer wall,
wherein the second cup part comprises:
a third outer wall extending from the bridge;
a fourth outer wall formed opposite the bridge and adjacent the second sealing part; and
a second bottom portion connecting the third outer wall to the fourth outer wall,
wherein the fourth outer wall has a height greater than that of the first outer wall,
wherein the first bottom portion and the second bottom portion are inclined toward the bridge at equal inclination angles relative to the bridge, and
wherein, prior to folding the first cup part and the second cup part, the first sealing part and the first outer wall form a right angle therebetween, and the second sealing part and the fourth outer wall form a right angle therebetween.

8. The pouch type secondary battery of claim 7, wherein the sealing parts extend outward from the first cup part and the second cup part, respectively, and
when the first cup part is folded to face the second cup part, the sealing parts are sealed and folded toward the second cup part.

9. The pouch type secondary battery of claim 8, wherein the sealed sealing part is folded two or more times in succession.

10. The pouch type secondary battery of claim 8, wherein the sealed sealing part has a folded length less than a height of the fourth outer wall.

11. The pouch type secondary battery of claim 7, wherein, when the first cup part is folded to face the second cup part, the first bottom portion and the second bottom portion are parallel to each other.

* * * * *